(12) United States Patent
Watanabe et al.

(10) Patent No.: US 10,767,740 B2
(45) Date of Patent: Sep. 8, 2020

(54) TENSIONER

(71) Applicant: TSUBAKIMOTO CHAIN CO., Osaka-shi, Osaka (JP)

(72) Inventors: Masanori Watanabe, Osaka (JP); Yuji Kurematsu, Osaka (JP)

(73) Assignee: TSUBAKIMOTO CHAIN CO., Osaka (JP)

(*) Notice: Subject to any disclaimer, the term of this patent is extended or adjusted under 35 U.S.C. 154(b) by 217 days.

(21) Appl. No.: 15/919,589

(22) Filed: Mar. 13, 2018

(65) Prior Publication Data

US 2018/0274638 A1  Sep. 27, 2018

(30) Foreign Application Priority Data

Mar. 21, 2017 (JP) ................................. 2017-054337
Mar. 28, 2017 (JP) ................................. 2017-062383

(51) Int. Cl.
*F16H 7/08* (2006.01)

(52) U.S. Cl.
CPC ... *F16H 7/0848* (2013.01); *F16H 2007/0812* (2013.01); *F16H 2007/0814* (2013.01);
(Continued)

(58) Field of Classification Search
CPC .......... F16H 7/08; F16H 7/084; F16H 7/0836; F16H 2007/0812; F16H 2007/0851;
(Continued)

(56) References Cited

U.S. PATENT DOCUMENTS 5,637,047 A * 6/1997 Schulze ................ F16H 7/0848
                                                   474/110
5,707,309 A * 1/1998 Simpson .................. F16H 7/08
                                                   474/110
(Continued)

FOREIGN PATENT DOCUMENTS

JP        2001-12569 A      1/2001
KR    20150126628 A      11/2015
(Continued)

OTHER PUBLICATIONS

Office Action dated Nov. 26, 2019, issued in counterpart KR Application No. 10-2018-0031473, with English translation (13 pages).

*Primary Examiner* — Michael R Mansen
*Assistant Examiner* — Raveen J Dias
(74) *Attorney, Agent, or Firm* — Westerman, Hattori, Daniels & Adrian, LLP

(57) ABSTRACT

To provide a tensioner capable of keeping oil pressure in an oil pressure chamber stable with a simple structure. The tensioner includes a pressure adjusting mechanism that adjusts oil pressure in the oil pressure chamber. The pressure adjusting mechanism includes a cylinder part, a piston unit set inside the cylinder part so as to be able to approach and separate from the oil pressure chamber, and a piston biasing unit. Between the cylinder part and the piston unit, a liquid tight condition is kept at any place between a position where the piston unit has moved closest to the oil pressure chamber and a position where the piston unit has moved closest to the adjustment space.

7 Claims, 9 Drawing Sheets

(52) U.S. Cl.
CPC ............... *F16H 2007/0853* (2013.01); *F16H 2007/0859* (2013.01); *F16H 2007/0872* (2013.01); *F16H 2007/0893* (2013.01); *F16H 2007/0897* (2013.01)

(58) Field of Classification Search
CPC ..... F16H 2007/0853; F16H 2007/2007; F16H 2007/0859; F16H 2007/0814; F16H 2007/0817; F16H 2007/0808; F16H 2007/0893; F16H 2007/0897; F16H 2007/084; F16H 2007/0806
See application file for complete search history.

(56) References Cited

U.S. PATENT DOCUMENTS

| | | | | |
|---|---|---|---|---|
| 5,908,363 | A * | 6/1999 | Suzuki | F16H 7/0848 474/101 |
| 6,139,454 | A * | 10/2000 | Simpson | F16H 7/0848 474/109 |
| 6,361,458 | B1 * | 3/2002 | Smith | F16H 7/0848 474/109 |
| 6,398,682 | B1 | 6/2002 | Suzuki et al. | |
| 6,592,479 | B2 * | 7/2003 | Nakakubo | F16H 7/0848 474/109 |
| 7,226,376 | B2 * | 6/2007 | Konishi | F16H 7/0836 474/110 |
| 8,585,519 | B2 * | 11/2013 | Hartmann | F16H 7/0836 474/110 |
| 8,968,127 | B2 * | 3/2015 | Kobayashi | F16H 7/0848 474/109 |
| 10,077,825 | B2 * | 9/2018 | Todd | F02B 67/06 |
| 2006/0089221 | A1 * | 4/2006 | Hashimoto | F01L 1/02 474/110 |
| 2006/0094549 | A1 * | 5/2006 | Yoshida | F16H 7/0836 474/110 |
| 2008/0318718 | A1 * | 12/2008 | Namie | F16H 7/0848 474/110 |
| 2009/0209378 | A1 * | 8/2009 | Kurematsu | F16H 7/0848 474/110 |
| 2012/0252615 | A1 * | 10/2012 | Konuma | F16H 7/0848 474/110 |
| 2014/0100068 | A1 * | 4/2014 | Kurematsu | F16H 7/08 474/110 |
| 2014/0187368 | A1 * | 7/2014 | Todd | F16H 7/08 474/110 |
| 2014/0200104 | A1 * | 7/2014 | Kurematsu | F16H 7/08 474/110 |
| 2016/0033016 | A1 | 2/2016 | Todd et al. | |
| 2016/0290447 | A1 | 10/2016 | Kunimatsu et al. | |
| 2016/0305512 | A1 | 10/2016 | Takagi et al. | |
| 2017/0059012 | A1 * | 3/2017 | Watanabe | F16H 7/0848 |
| 2017/0130807 | A1 * | 5/2017 | Kurematsu | F16H 7/0848 |
| 2018/0180191 | A1 * | 6/2018 | Shinoyama | F16H 7/08 |
| 2018/0274636 | A1 * | 9/2018 | Watanabe | F16H 7/0836 |
| 2018/0313434 | A1 * | 11/2018 | Watanabe | F16H 7/0848 |
| 2019/0120343 | A1 * | 4/2019 | Watanabe | F01L 1/053 |
| 2019/0257391 | A1 * | 8/2019 | Watanabe | F16H 7/0848 |
| 2019/0257392 | A1 * | 8/2019 | Watanabe | F16H 7/08 |

FOREIGN PATENT DOCUMENTS

| | | |
|---|---|---|
| KR | 20160118934 A | 10/2016 |
| KR | 20160123230 A | 10/2016 |

* cited by examiner

TENSIONER

BACKGROUND OF THE INVENTION

1. Field of the Invention

The present invention relates to a tensioner that applies appropriate tension to a running chain, belt, or the like.

2. Description of the Related Art

It has been common practice to use a tensioner for maintaining appropriate tension in a chain or the like. For example, a known chain guide mechanism uses a tensioner to bias a tensioner lever for slidably guiding a drive chain, such as an endless roller chain passing over respective sprockets of a crankshaft and a cam shaft inside an engine room, to maintain appropriate tension of the chain or the like.

One known tensioner 510 used in such a chain guide mechanism includes, as shown in FIG. 8, a plunger 520 having a plunger hole 521 that is open on the rear side, a housing 530 having a plunger accommodating hole 531 that is open on the front side for accommodating the plunger 520, a relief valve mechanism that releases oil in an oil pressure chamber 511 to the outside of the plunger 520 when oil pressure in the oil pressure chamber 511 builds up, and a main spring 540 accommodated in the oil pressure chamber 511 formed between the plunger 520 and the plunger accommodating hole 531 so as to be able, to expand and contract and to urge the plunger 520 toward the front side (see, for example, Japanese Patent application Laid-open No. 2001-12569).

In this tensioner 518 described in Japanese Patent Application Laid-open. No. 2001-12569, a pressure passage 524 in communication with the oil pressure chamber 511, a discharge hole 523 that connects the pressure passage 524 with the outside of the plunger 520, and a spring accommodating space 512 formed on the front side of the pressure passage 524, are formed at the bottom of the plunger 520. The relief valve mechanism is made up of a valve member 560 slidably fitted in the pressure passage 524, and a relief spring 552 set inside the spring accommodating space 512 to urge the valve member 560 toward the oil pressure chamber 511.

In this tensioner 510, when the oil pressure in the oil pressure chamber 511 rises, the valve member 560 moves forward against the urging force of the relief spring 552 so that the pressure passage 524 communicates with the discharge hole 523 and the oil is released from the discharge hole 523.

SUMMARY OF THE INVENTION

One problem with such a tensioner 510 was that the oil pressure in the oil pressure chamber 511 sometimes varied largely due to the fluctuations in the force the plunger 520 received from the chain, or the variation in the amount of oil supplied to the oil pressure chamber 511. The tensioner 510 described in Japanese Patent Application Laid-open No. 2001-12569 could assume only two positions, i.e., one where the valve member 560 blocks the pressure passage 524 to stop release of oil to the outside of the plunger 520, and the other where the valve member 560 moves forward by the oil pressure from the oil pressure chamber 511 to allow the oil to be released from the discharge hole 523 to the outside of the plunger 520, because of which it was difficult to keep the oil pressure in the oil pressure chamber 511 stable.

With the relief valve mechanism of Japanese Patent Application Laid-open No. 2001-12569, when the oil pressure in the oil pressure chamber 511 rises, part of the oil supplied from the hydraulic power source such as an oil pump is released to the outside. This increases oil consumption and requires higher power from the hydraulic power source.

Another problem with a relief valve mechanism such as the one shown in Japanese Patent Application Laid-open No. 2001-12569 was that, the oil in the oil pressure chamber 511 would leak out gradually through the discharge hole 523 when the engine was stopped during which no oil was supplied to the tensioner 510, as a result of which, when the engine was restarted, the amount of oil retained in the oil pressure chamber 511 was not sufficient, leading to failures such as abnormal noise.

The present invention solves these problems and it is an object of the invention to provide a tensioner that can keep the oil pressure inside an oil pressure chamber stable with a simple structure.

The present invention solves the problems described above toy providing a tensioner including: a plunger having a plunger hole that is open on a rear side; a housing having a plunger accommodating hole that is open on a front side and accommodates the plunger; a main biasing unit accommodated inside an oil pressure chamber, formed between the plunger and the plunger accommodating hole so as to expand and contract, and urging the plunger toward the front side; and a pressure adjusting mechanism adjusting oil pressure in the oil pressure chamber. The pressure adjusting mechanism includes a cylinder part, a piston unit set inside the cylinder part so as to be able to approach and separate from the oil pressure chamber and partitioning a space formed between the plunger and the housing into the oil pressure chamber and an adjustment space, and a piston biasing unit biasing the piston unit toward the oil pressure chamber. Between the cylinder part and the piston unit a liquid tight condition is kept at any place between a position where the piston unit has moved closest to the oil pressure chamber and a position where the piston unit has moved closest to the adjustment space.

According to one aspect of the present invention, the pressure adjusting mechanism that adjusts the oil pressure inside the oil pressure chamber includes a cylinder part, a piston, unit set inside the cylinder part so as to be able to approach and separate from the oil pressure, chamber and partitioning a space formed between the plunger and the housing into the oil pressure chamber and an adjustment space, and a piston biasing unit that biases the piston unit toward the oil pressure chamber. Between the cylinder part and the piston unit, a liquid tight condition is kept at any place between a position where the piston unit has moved closest to the oil pressure chamber and a position where the piston unit has moved closest to the adjustment space.

When the oil pressure in the oil pressure chamber builds up, the piston unit moves away from the oil pressure chamber. As the volume of the oil pressure chamber increases in accordance with the moving amount of the piston unit, the pressing force of the plunger applied to the chain can be gradually reduced. Thus the oil pressure in the oil pressure chamber and the pressing force of the plunger can be made stable with a simple structure.

Moreover, since release of part of the oil to the outside as practiced in conventional tensioners that have a relief valve mechanism can be avoided, the oil consumption can be reduced, which enables a reduction in size of the hydraulic power source. Gradual leakage of oil from the oil pressure chamber to the outside when the engine is stopped during which no oil is supplied to the tensioner can also be avoided, so that the amount of oil in the oil pressure chamber can be maintained over a long period of time, and failures such as abnormal noise when, the engine is restarted can be prevented.

According to another aspect of the present invention, a portion in a front to back direction of an inner circumferential surface of the plunger hole serves as a cylinder inner circumferential surface opposite the piston unit. This obviates the need to form a cylinder inner circumferential surface separately from the plunger hole, so that the production cost can be reduced. Moreover, by utilizing the inner circumferential surface of the plunger hole as the cylinder inner circumferential surface, the diameter of the piston unit can be set larger, so that the volume change of the oil pressure chamber that occurs with the movement of the piston unit can be made larger.

According to another aspect of the present invention, the pressure adjusting mechanism includes a first restricting part that restricts movement of the piston unit toward the adjustment space. The range of movement of the piston unit is thus limited, so that the length of the cylinder inner circumferential surface, which needs precise machining, along the moving direction of the piston can be reduced, which enables a reduction in the production cost. Also, during assembly, the first restricting part can be utilized as a portion for determining the position of the piston unit, so that the assembling cost can be reduced.

According to another aspect of the present invention, the pressure adjusting mechanism includes a second restricting part that restricts movement of the piston unit toward the oil pressure chamber. The range or movement of the piston unit is thus limited, so that the length of the cylinder inner circumferential surface, which needs precise machining, along the moving direction of the piston can be reduced, which enables a reduction in the production cost. Also, during assembly, the second restricting part can be utilized as a portion for determining the position of the piston unit, so that the assembling cost can be reduced.

According to another aspect of the present invention, the piston spring as the piston biasing unit has a larger spring force than that of the main spring as the main biasing unit. Therefore, even when the main spring is set so as to press the piston unit, the piston unit can be kept pressed against the second restricting part in normal operation.

According to another aspect of the present invention, the tensioner further includes an oil supply passage that connects the outside of the housing with the adjustment space. The piston unit is configured as a check valve that allows the oil to flow from the adjustment space to the oil pressure chamber and prevents the oil from flowing from the oil pressure chamber to the adjustment space. Therefore, the adjustment space can be utilized as an oil reservoir that can reserve oil to foe supplied to the oil pressure chamber. Also, as the piston unit serves as the check valve, the number of components is reduced, and the structure of the tensioner can be simplified.

According to another aspect of the present invention, the piston unit includes a check valve unit and an outer tube member disposed around the outer circumferential surface of the check valve unit. The outer tube member includes a piston outer circumferential surface opposite the cylinder part. This obviates the need to provide a piston outer circumferential surface that needs precise machining to the check valve unit, and enables usage of an existing check valve unit.

According to another aspect of the present invention, the pressure adjusting mechanism includes an inner sleeve set inside the plunger hole. A piston spring as the piston biasing unit is accommodated in the inner sleeve. The inner sleeve is fitted with the piston unit. The piston unit can be kept in a stable posture inside the plunger hole, and failures such as buckling or the like of the piston spring can be avoided. Also, since the piston unit, piston spring, and inner sleeve can be handled as a single unit, the assembling cost can be reduced.

According to another aspect of the present invention, the inner sleeve includes a sleeve through hole that extends from an inner circumferential surface to an outer circumferential surface thereof. When utilizing the space inside the inner-sleeve as an oil reservoir, the oil flowing around the inner sleeve can be collected into the inner sleeve through the sleeve through hole, so that a sufficient amount of oil can be secured in the oil reservoir.

According to another aspect of the present invention, the cap member that is attached to the front end of the cylindrical plunger body includes a shaft part integral with a cap body part and extending downward from a bottom surface of the cap body part. The shaft part is set radially inside a piston spring as a piston biasing unit and functions as a first restricting part that restricts movement of the piston unit toward the adjustment space. The movement of the piston unit toward the adjustment space can be restricted with a simple structure this way by using the cap member attached to the plunger body. Moreover, as the shaft part is set radially inside the piston spring, the diameter of the piston spring can be set larger, which ensures that the piston spring is kept in a stable posture, and also, the biasing force of the piston spring can be set larger.

DESCRIPTION OF THE PREFERRED EMBODIMENTS

A tensioner 10 according to a first embodiment of the present invention, will be described with reference to the drawings.

First, the tensioner 10 is incorporated in a chain transmission used in a timing system or the like of a car engine.

Figure 1:
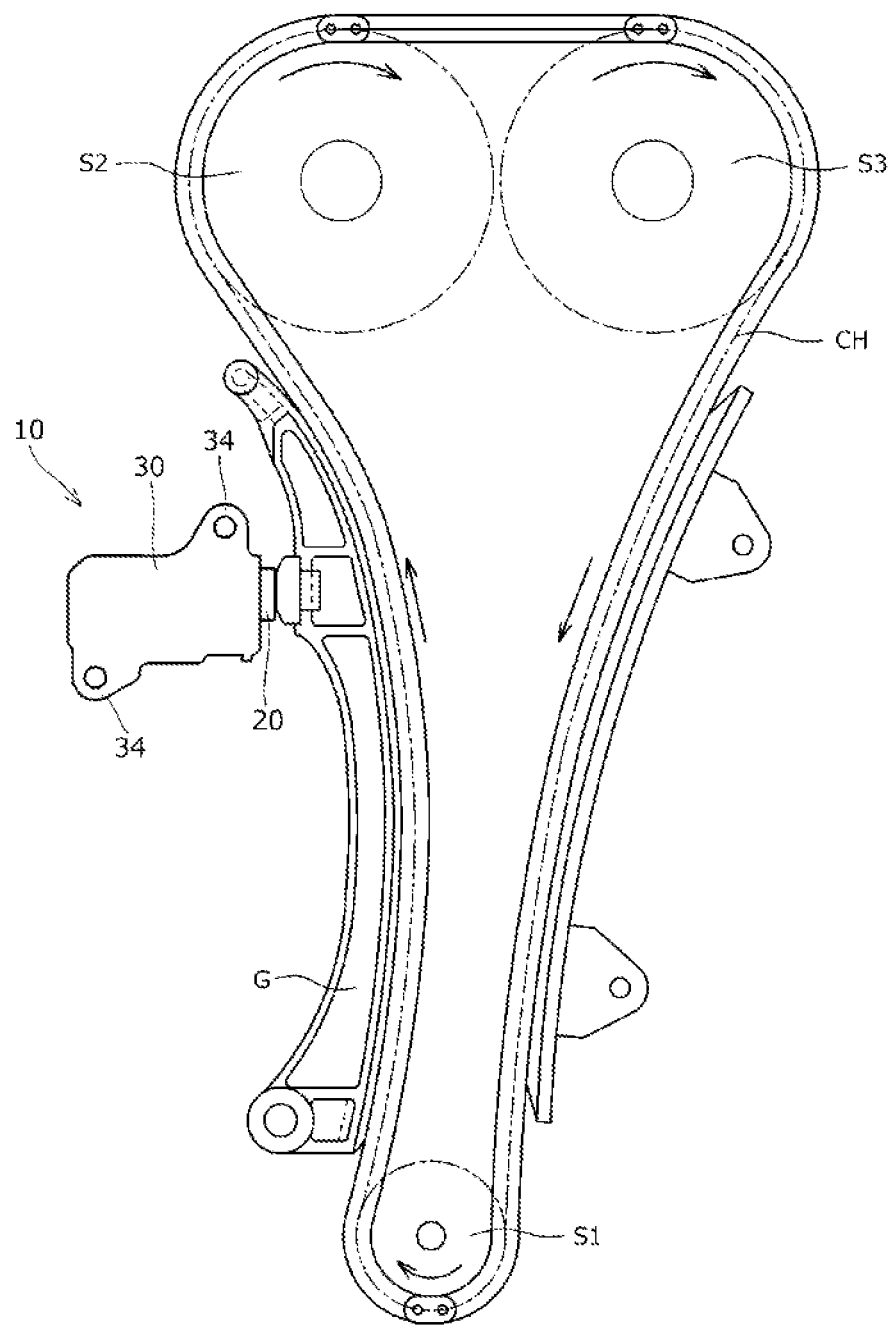
FIG. 1 is an illustrative diagram showing a timing system in which a tensioner according to a first embodiment of the present invention is incorporated.

As shown in FIG. 1, the tensioner is attached to an engine block (not shown) to apply appropriate tension to the slack side of a drive chain CH passing over a plurality of sprockets S1 to S3 via a tensioner lever G to reduce vibration during the drive.

Figure 2:
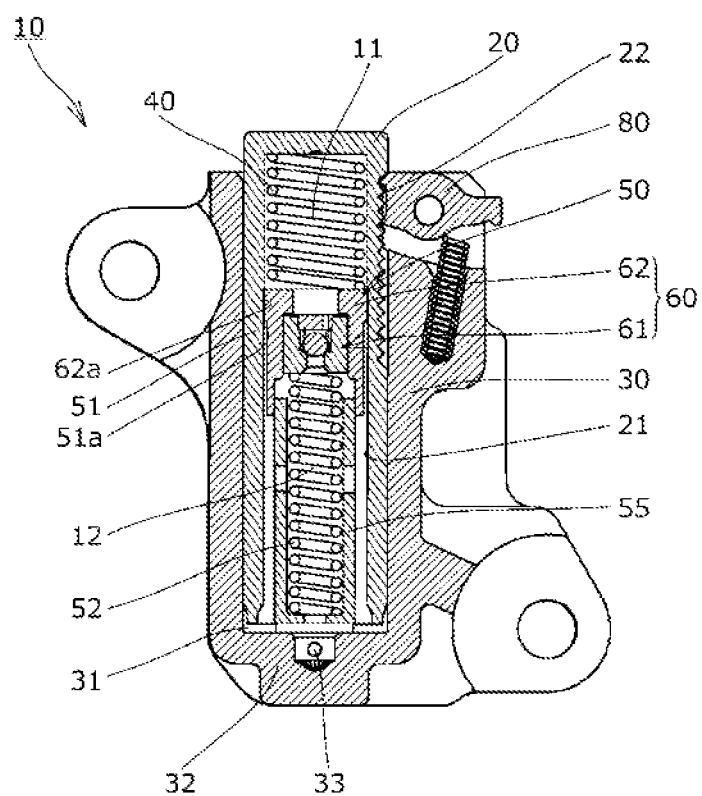
FIG. 2 is a cross-sectional view illustrating the tensioner.
Figure 3:
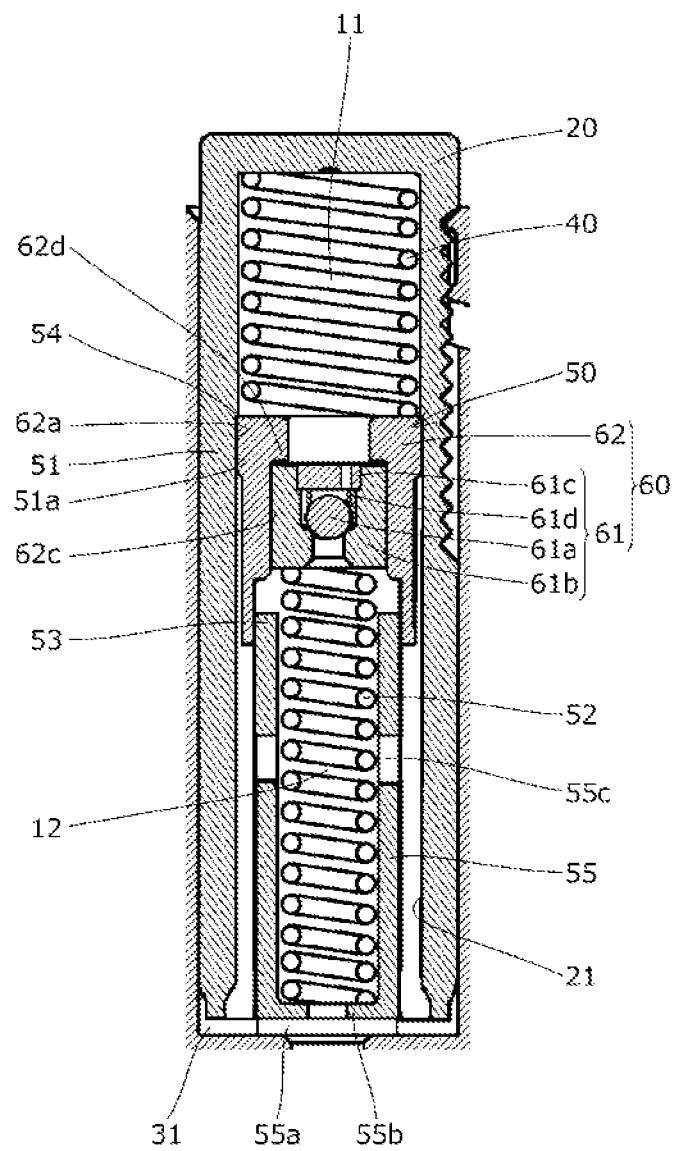
FIG. 3 is a cross-sectional view illustrating part of the tensioner on a larger scale.

The tensioner 10 includes, as shown in FIG. 2 and FIG. 3, a plunger 20 having a cylindrical plunger hole 21 that is open on a rear side, a housing 30 having a plunger accommodating hole 31 that is open on a front side for accommodating the plunger 20, a main spring (main biasing unit) 40 accommodated inside an oil pressure chamber 11 that is formed between the plunger 20 and the plunger accommodating hole 31 so as to be able to expand and contract and to urge the plunger 20 toward the front side, a pressure adjusting mechanism 50 that adjusts the oil pressure in the oil pressure chamber 11, and a ratchet 80 pivotally supported on the housing 30 and biased by a spring to engage with the plunger 20.

Hereinafter, various constituent elements of the tensioner 10 will be described with reference to the drawings.

The plunger 20 is made of metal such as iron or the like and inserted in the plunger accommodating hole 31 so as to be able to move back and forth in the front to back direction, as shown in FIG. 2 and FIG. 3.

The diameter of the plunger hole 21 is reduced in the oil pressure chamber 11 from that of an adjustment space 12 to form a stepped portion, which serves as a second restricting part 54 to be described later that restricts the piston unit 60 from moving toward the oil pressure chamber 11.

Rack teeth 22 are formed in the outer circumferential surface of the plunger 20 to mate with the ratchet 80.

The housing 30 includes, as shown in FIG. 1 and FIG. 2, the cylindrical plunger accommodating hole 31, a bottom part 32 formed on the rear side, an oil supply passage 33 in the forts, of a hole provided in the bottom part 32 to supply oil from outside to the adjustment space 12, and a mounting part 34 for fixedly attaching the housing 30 to an engine block.

The main spring 40 is accommodated in the oil pressure chamber 11 so as to be able to expand and contract as shown in FIG. 2, and, more specifically, has one end abutting on the bottom of the plunger hole 21 (front side portion of the plunger 20) and the other end arranged in contact with the piston unit 60 (outer tube member 62).

The pressure adjusting mechanism 50 adjusts the oil pressure in the oil pressure chamber 11 and includes, as shown in FIG. 2 and FIG. 3, a cylinder part 51 having a cylindrical cylinder inner circumferential surface 51a, the piston unit 60 set inside the cylinder part 51 so as to be able to approach and separate from the oil pressure chamber 11 and partitioning the space formed between the plunger 20 and the housing 30 into the oil pressure chamber 11 and the adjustment space 12, a piston spring (piston biasing unit) 52 that biases the piston unit 60 toward the oil pressure chamber 11, a first restricting part 53 that restricts movement of the piston unit 60 toward the adjustment space 12, a second restricting part 54 that restricts movement of the piston unit 60 toward the oil pressure chamber 11, and an inner sleeve 55 set inside the plunger hole 21.

The cylinder part 51 is a section used for setting the piston unit 60 therein so as to be slidable back and forth.

In this embodiment, as shown in FIG. 2 and FIG. 3, a portion in the front to back direction of the plunger 20 having the plunger hole 21 serves as the cylinder part 51. In other words, a portion in the front to back direction of the inner circumferential surface of the plunger hole 21 serves as the cylindrical cylinder inner circumferential surface 51a.

In this embodiment, the piston unit 60 is configured as a check valve that allows the oil to flow from the adjustment space 12 into the oil pressure chamber 11 and prevents the oil from flowing out from the oil pressure chamber 11 to the adjustment space 12.

The piston unit 60 includes a check valve unit 61 that functions as the check valve, and the outer tube member 62 arranged around the check valve unit 61 as shown in FIG. 2 and FIG. 3.

As shown in FIG. 3, the check valve unit 61 is made up of a spherical check ball 61a, a ball seat 61b having a check ball holding part that is open on the side facing the oil pressure chamber 11, a retainer 61c that restricts the movement of the check ball 61a, and a ball spring 61d disposed between the check ball 61a and the retainer 61c. These components of the check valve unit 61 are made of metal, synthetic resin, or the like.

The check valve unit 61 may have any configuration as long as it allows the oil to flow into the oil pressure chamber 11 and prevents the oil from flowing out of the oil pressure chamber 11. The ball spring 61d may be omitted, for example.

Figure 4:
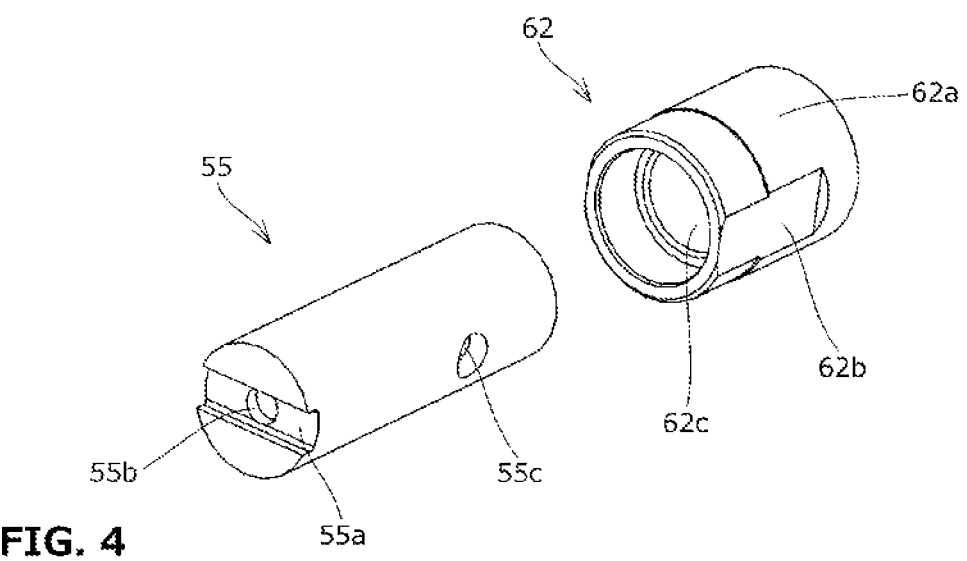
FIG. 4 is a perspective view illustrating an inner sleeve and an outer tube member that make up a pressure adjusting mechanism.

The outer tube member 62 is made of metal and the like, and as shown in FIG. 3 and FIG. 4, has a substantially cylindrical shape in its entirety.

The outer circumferential surface of the outer tube member 62 includes a large-diameter part on the oil pressure chamber 11 side, and a small-diameter part on the adjustment space 12 side as shown in FIG. 3 and FIG. 4.

The large-diameter part of the outer tube member 62 on the oil pressure chamber 11 side serves as a cylindrical piston outer circumferential surface 62a disposed opposite the cylinder inner circumferential surface 51a.

There is only a slight difference in diameter between the cylinder inner circumferential surface 51a and the piston outer circumferential surface 62a such that a liquid tight condition is kept between the cylinder inner circumferential surface 51a and the piston outer circumferential surface 62a. Therefore, the oil is prevented from flowing between the cylinder inner circumferential surface 51a and the piston outer circumferential surface 62a.

The outer circumferential surface of the outer tube member 62 includes cut-away portions 62b at two symmetrical positions (180° apart) where the outer surface is cut away from one end on the adjustment space 12 side of the outer tube member 62 to a middle portion of the large-diameter part.

The inner circumferential surface of the outer tube member 62 includes, as shown in FIG. 3, a setting part 62c for setting the check valve unit 61 (ball seat 61b) inside in tight or loose fit, a small-diameter part formed on one side of the setting part 62c facing the oil pressure chamber 11 and having a smaller diameter than the setting part 62c, and a large-diameter part formed on one side of the setting part 62c facing the adjustment space 12 and having a larger diameter than the setting part 62c.

The stepped portion of the inner circumferential surface of the outer tube member 62 between the setting part 62c and the small-diameter part on the oil pressure chamber 11 side serves as a restricting part 62d that restricts movement of the check valve unit 61 toward the oil pressure chamber 11.

The inner sleeve 55 is made of metal and the like, and as shown in FIG. 3 and FIG. 4, has a substantially cylindrical shape in its entirety.

A groove 55a is formed at the bottom on the rear side of the inner sleeve 55 so as to extend radially through the center of the inner sleeve 55 as shown in FIG. 3 and FIG. 4.

An annular part 55b that extends radially inward from the inner circumferential surface of the inner sleeve 55 is formed near the bottom on the rear side of the inner sleeve 55.

The inner sleeve 55 has a plurality of sleeve through holes 55c extending through between the inner and outer circumferential surfaces thereof.

With these groove 55a and sleeve through holes 55c, the oil around the inner sleeve 55 can be collected radially inside of the inner sleeve 55, which functions as an oil reservoir that can store the oil to be supplied to the oil pressure chamber 11.

The front end of the inner sleeve 55 (part on the oil pressure chamber 11 side) is loosely fitted into the rear-end of the outer tube member 62 (part on the adjustment space 12 side) as shown in FIG. 3.

In this embodiment, the front end of the inner sleeve 55 (part on the oil pressure chamber 11 side) serves as a first restricting part 53 that restricts movement of the piston unit 60 toward the adjustment space 12.

A piston spring 52 is disposed inside the inner sleeve 55 as shown in FIG. 3.

The piston spring 52 has one end in contact with the piston unit 60 (check valve unit 61) and the other end in contact with the annular part 55b of the inner sleeve 55.

The piston spring 52 is designed to have a larger spring force than the main spring 40.

Figure 5A:
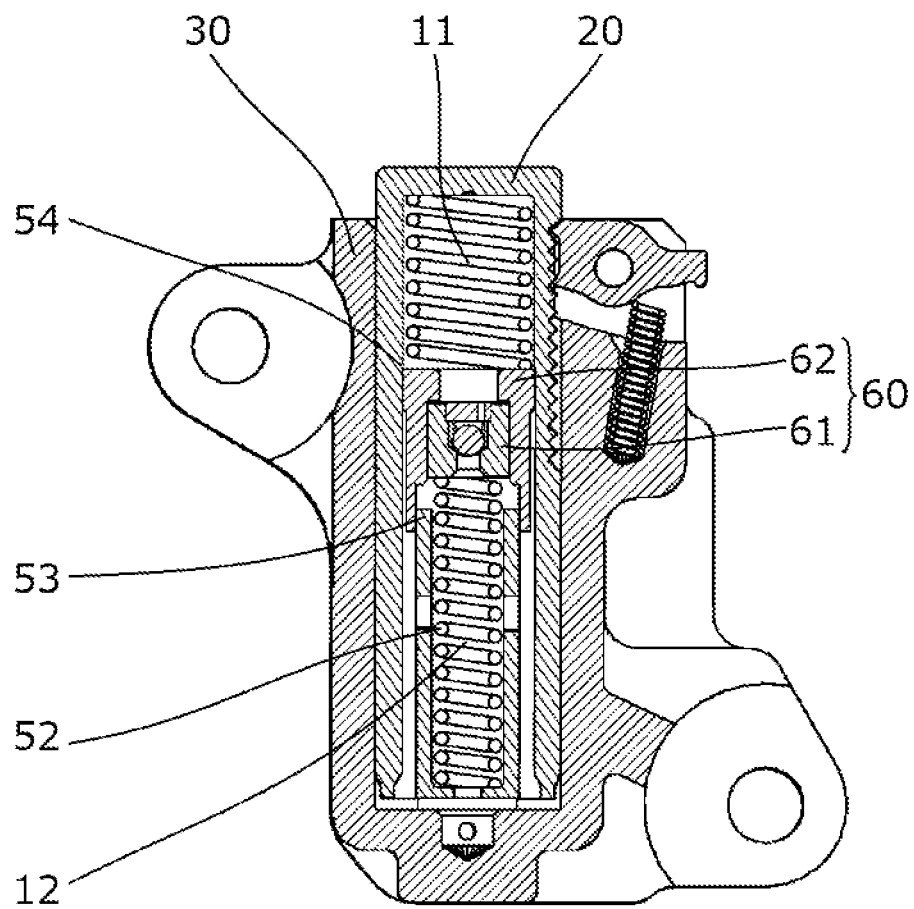
FIG. 5A is a cross-sectional view illustrating a state of the pressure adjusting mechanism in normal operation.

In normal operation of the tensioner 10 of this embodiment configured as described above, the piston unit 60 is first biased by the piston spring 52 toward the oil pressure chamber 11 as shown in FIG. 5A so that the piston unit 60 (outer tube member 62) is pressed against the step-like second restricting part 54 on the inner circumferential surface of the plunger hole 21.

Figure 5B:
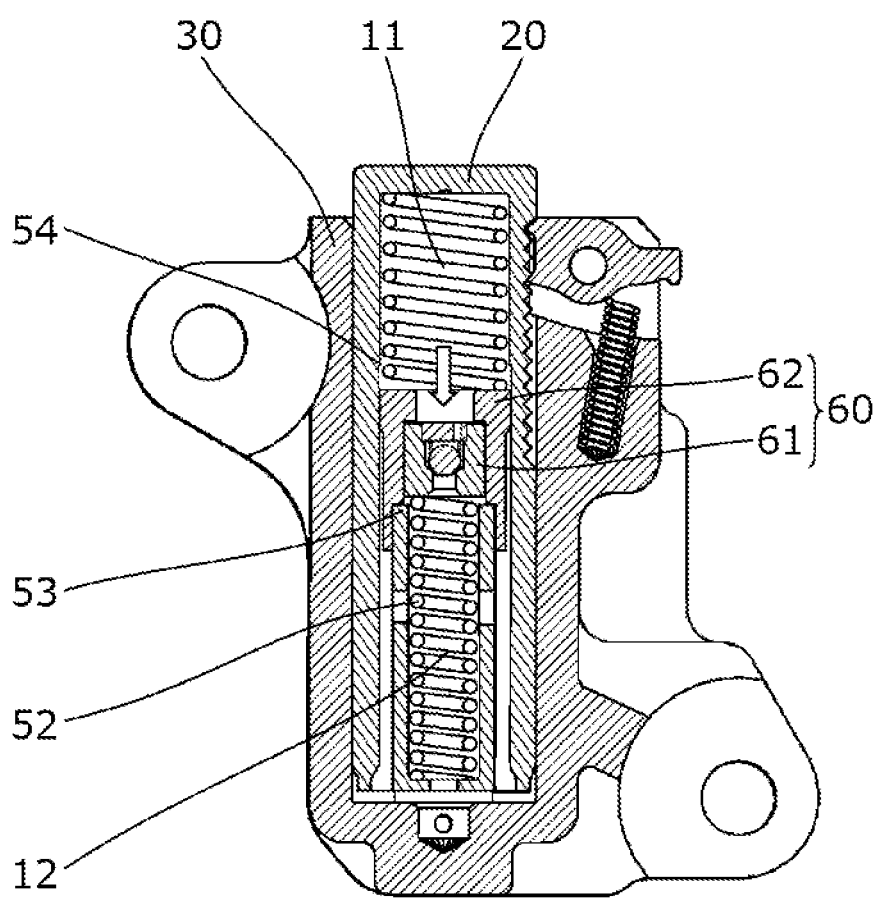
FIG. 5B is a cross-sectional view illustrating a state of the pressure adjusting mechanism when oil pressure rises.

When the oil pressure in the oil pressure chamber 11 builds up, the piston unit 60 moves away from the oil pressure chamber 11 by the oil pressure from the oil pressure chamber 11 as shown in FIG. 5B. As the volume of the oil pressure chamber 11 increases in accordance with the moving amount of the piston unit 60, the pressing force of the plunger 20 applied to the drive chain CH can be gradually reduced. Thus the oil pressure in the oil pressure chamber 11 and the pressing force of the plunger 20 can be made stable with a simple structure.

As shown in FIGS. 5A and 5B, at any place between the position where the piston unit 60 is closest to the oil pressure chamber 11 (and stopped from moving further by the second restricting part 54) and the position where the piston unit is closest to the adjustment space 12 (and stopped from moving further by the first restricting part 53), a liquid tight condition is kept between the cylinder part 51 and the piston unit 60. More specifically, a liquid tight condition is kept between the cylinder inner circumferential surface 51a and the piston outer circumferential surface 62a.

The tensioner 10 of this embodiment includes the oil supply passage 33 that connects the outside of the housing 30 with the adjustment space 12. The piston unit 60 is configured as a check valve that allows the oil to flow from the adjustment space 12 to the oil pressure chamber 11 and prevents the oil from flowing from the oil pressure chamber 11 to the adjustment space 12, so that the adjustment space 12 serves as the oil reservoir that can store the oil to be supplied to the oil pressure chamber 11.

Next, a tensioner 10 according to a second embodiment of the present invention will be described with reference to FIG. 6. The second embodiment is, in part, exactly the same as the previously described first embodiment, and therefore its configurations will not be described except for the differences.

Figure 6:
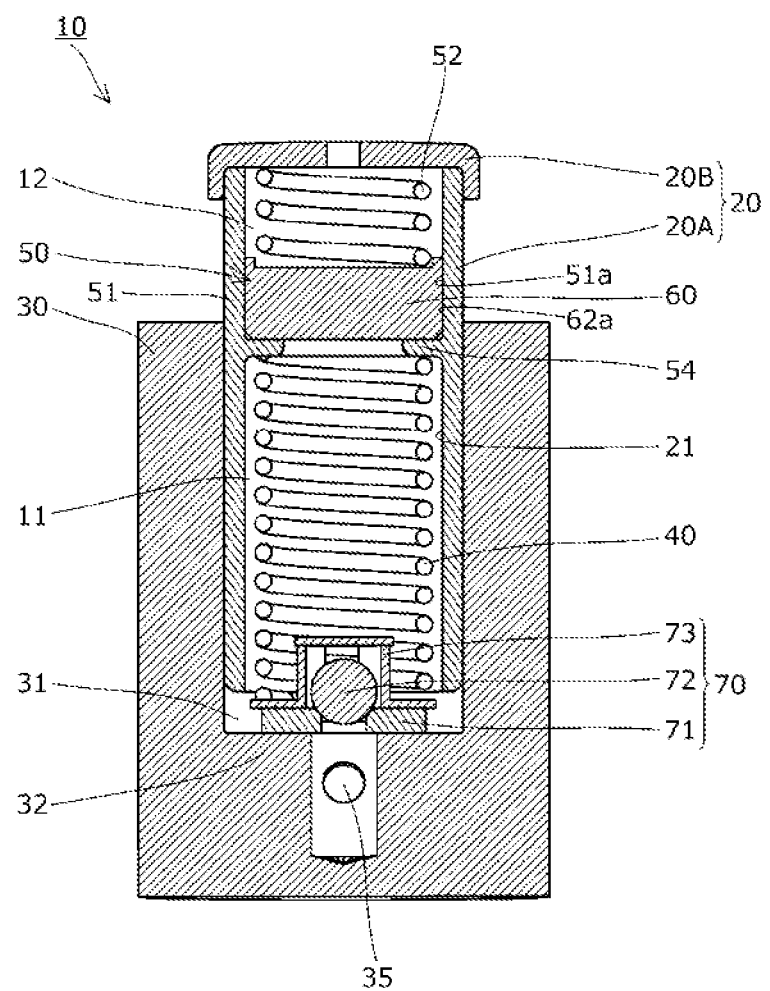
FIG. 6 is a cross-sectional view illustrating a tensioner according to a second embodiment.

In the second embodiment, the plunger 20 is made up of a cylindrical plunger body 20A having a plunger hole 21, and a cap member 20B attached to the front end of the plunger body 20A, as shown in FIG. 6.

The plunger body 20A is made of metal such as iron, while the cap member 20B is made of synthetic resin, metal or the like.

The cap member 20B configures a bottom part at the front end of the plunger hole 21 as shown in FIG. 6. The cap member 20B is provided with an external relief hole that connects the adjustment space 12 with the outside of the plunger 20.

This external relief hole may not necessarily be provided, but should preferably be provided, from a viewpoint of preventing an excessive buildup of pressure, inside the adjustment space 12.

In the second embodiment, an oil supply hole 35 is provided in the bottom part 32 of the housing 30 to supply oil from the outside into the oil pressure chamber 11.

In the second embodiment, the pressure adjusting mechanism 50 includes, as shown in FIG. 6, a cylinder part 51 having a cylinder inner circumferential surface 51a, a piston unit 60 set inside the cylinder part 51, a piston spring 52 that biases the piston unit 60 toward the oil pressure chamber 11, and a second restricting part 54 that restricts movement of the piston unit 60 toward the oil pressure chamber 11.

In the second embodiment, a portion in the front to back direction of the plunger 20 functions as the cylinder part 51.

The piston unit 60 is configured as a single, substantially columnar component.

The second restricting part 54 is formed as a portion protruding from the inner circumferential wall of the plunger hole 21 in the plunger body 20A radially inward.

In the second embodiment, as shown in FIG. 6, a check valve unit 70 that allows the oil to flow from outside into the oil pressure chamber 11 through the oil supply hole 35 and prevents the oil from flowing out from the oil supply hole 35 is set in the bottom part 32 of the housing 30.

As shown in FIG. 6, the check valve unit 70 is made up of a ball seat 71 disposed in tight contact with the front face of the bottom part 32 of the housing 30, a spherical check ball 72 that can be seated on the ball seat 71 in tight contact therewith, and a retainer 73 arranged on the front side of the check ball 72 to restrict the movement of the check ball 72.

The check valve unit 70 may have any configuration as long as it allows the oil to flow into the oil pressure chamber 11 and prevents the oil from flowing out of the oil pressure chamber 11. A ball spring, for example, that biases the check ball 72 toward the ball seat 71, may be set between the check ball 72 and the retainer 73.

Next, a modification example of the second embodiment will be described with reference to FIG. 7.

Figure 7:
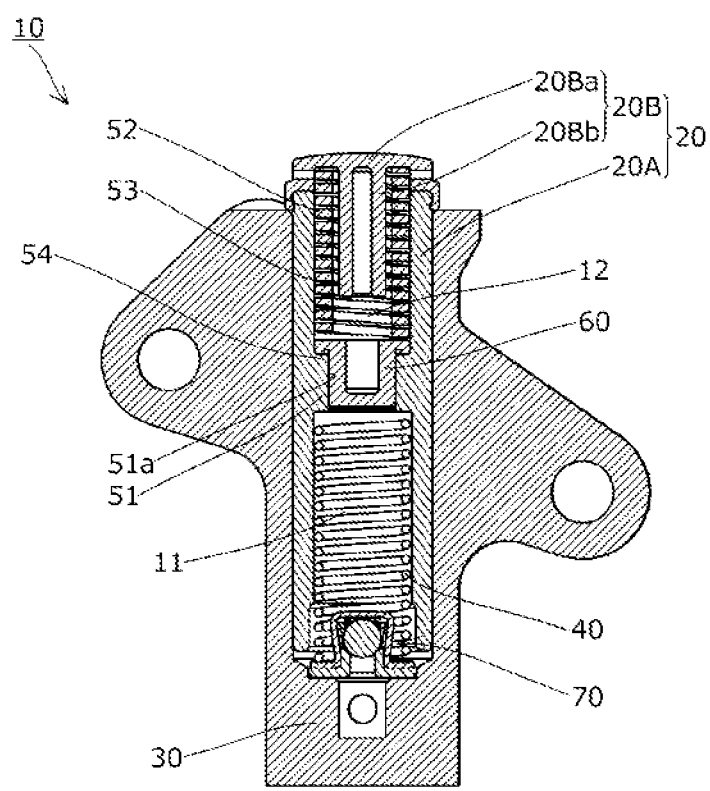
FIG. 7 is a cross-sectional view illustrating a modification example of the tensioner.
Figure 8:
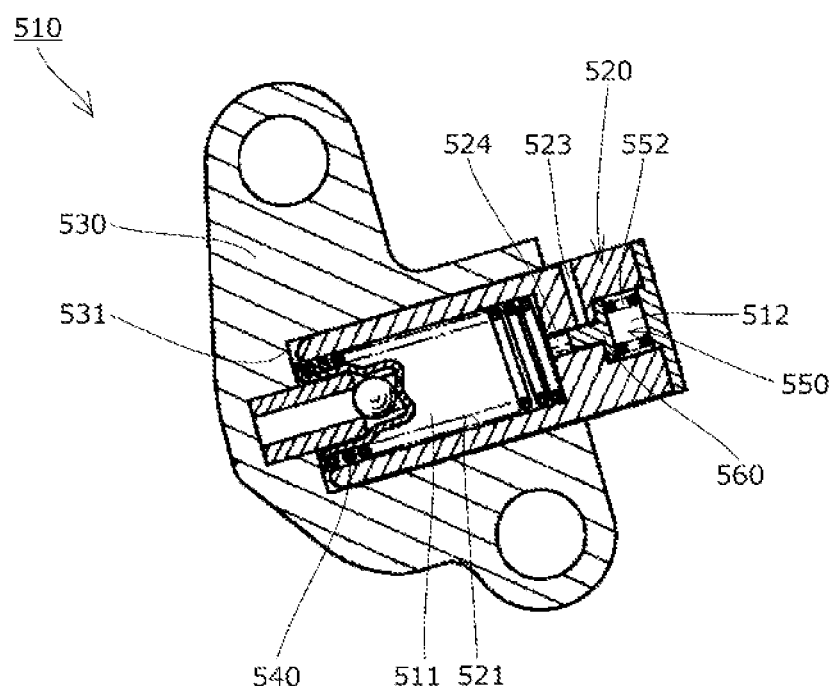
FIG. 8 is a cross-sectional view illustrating a tensioner of related art.

In the modification example shown in FIG. 7, the cap member 20B is made up of a cap body part 20Ba and a cylindrical shaft part 20Bb integral therewith and extending downward from a bottom surface of the cap body part 20Ba.

The shaft part 20Bb has a smaller diameter than the cap-body part 20Ba and is set radially inside the piston spring 52, to function as a first restricting part 53 that restricts the movement of the piston unit 60 toward the adjustment space 12. With the first restricting part 53 being set radially inside the piston spring 52 this way, the diameter of the piston spring 52 can be set larger, and also, the biasing force of the piston spring 52 can be set larger.

In the modification example shown, in FIG. 7, the external relief hole that, connects the adjustment space 12 with the outside of the plunger 20 is formed to the cap body part 20Ba so as to extend along a lateral direction.

While embodiments of the present invention have been described in detail, the present invention is not limited to the above-described embodiments and may be carried out with various design changes without departing from the scope of the present invention set forth in the claims. Various configurations of the embodiments and modification examples can be combined as required to configure other tensioners.

For example, while the tensioner 10 was described as a component to be incorporated in a timing system of a car engine in the embodiments above, the purpose of use of the tensioner 10 is not limited to this specific application.

Also, while the tensioner 10 was described as a component that applies tension to a drive chain CH with a tensioner lever G in the embodiment above, the plunger 20 can directly guide the drive chain CH slidably with a distal end thereof to apply tension to the drive chain CH.

The tensioner may not necessarily be applied to a transmission mechanism with a drive chain CH but can also be used for similar transmission mechanisms that use belts, ropes and the like, and can be applied in a variety of industrial fields where it is required to apply tension to an elongated component.

While the housing 30 accommodating the plunger 20 is described as the component known as a tensioner body that is attached to an engine block or the like in the embodiments described above, the housing 30 is not limited to the specific form described above and may foe a cylindrical component known as a sleeve inserted into a body hole formed in the tensioner body.

In the embodiments described above, a liquid tight condition is kept between the cylinder inner circumferential surface 51a and the piston outer circumferential surface 62a by setting a very small difference in diameter between the cylinder inner circumferential surface 51a and the piston outer circumferential surface 62a. The method of keeping a liquid tight condition is not limited to the one described above. For example, a sealing member such as a packing may be disposed between the cylinder inner circumferential surface 51a and the piston outer circumferential surface 62a to keep a liquid tight condition.

The "liquid tight condition" referred to herein is not limited to complete blocking of oil flow between the cylinder inner circumferential surface and the piston outer circumferential surface but also includes a seal that allows a very small amount of oil to flow between the cylinder inner circumferential surface and the piston outer circumferential surface.

In the embodiments described above, part of the inner circumferential surface of the plunger hole 21 is utilized as the cylinder inner circumferential surface 51a. The cylinder inner circumferential surface 51a (cylinder part 51) may be formed otherwise. For example, a cylinder member separately formed from the plunger 20 may be set inside the plunger hole 21 and the inner circumferential surface of this cylinder member can be utilized as the cylinder inner circumferential surface 51a.

In the embodiments described above, the piston unit 60 is restricted from moving toward the oil pressure chamber 11 or the adjustment space 12 by providing the first, restricting part 53 and second restricting part 54. Alternatively, instead of providing such restricting parts 53 and 54, the position of the piston unit 60 may be controlled by adjusting the spring force (biasing force) of the main spring (main biasing unit) 40 and the piston spring (piston biasing unit) 52.

In the first embodiment described above, the oil pressure chamber 11 is located on the front side while the oil reservoir (adjustment space 12) is provided on the rear side, with the cylinder part 51 and piston unit (check valve) 60 disposed between these oil pressure chamber 11 and oil reservoir (adjustment space 12) as shown in FIG. 2. Instead, the oil pressure chamber 11 may be located on the rear side and the oil reservoir (adjustment space 12) on the front side, with the cylinder part 51 and piston unit (check valve) 60 disposed between these oil pressure chamber 11 and oil reservoir (adjustment space 12). In this case, the oil supply passage 33 that connects the outside of the housing 30 with the oil reservoir (adjustment space 12) may be configured by grooves and holes formed in the housing 30 and plunger 20.

What is claimed is:

1. A tensioner comprising:
    a plunger having a plunger hole that is open on a rear side; a housing having a plunger accommodating hole that is open on a front side and accommodates the plunger; a main biaser that is accommodated inside an oil pressure chamber and that is formed between the plunger and the plunger accommodating hole so as to expand and contract, and urging the plunger toward the front side; and a pressure adjusting mechanism adjusting oil pressure in the oil pressure chamber,
    the pressure adjusting mechanism including a cylinder part, a piston unit set inside the cylinder part so as to be able to approach and separate from the oil pressure chamber and partitioning a space formed between the plunger and the housing into the oil pressure chamber and an adjustment space, and a piston biaser biasing the piston unit toward the oil pressure chamber,
    between the cylinder part and the piston unit a liquid tight condition being kept at any place between a position where the piston unit has moved closest to the oil pressure chamber and a position where the piston unit has moved closest to the adjustment space,
    wherein the pressure adjusting mechanism includes an inner sleeve set inside the plunger accommodating hole, a piston spring as the piston biaser is set in the inner sleeve, and the inner sleeve is fitted with the piston unit, and
    wherein the inner sleeve includes a sleeve through hole that extends from an inner circumferential surface to an outer circumferential surface thereof.

2. The tensioner according to claim 1, wherein a portion in a front to back direction of an inner circumferential surface of the plunger accommodating hole serves as a cylinder inner circumferential surface opposite the piston unit.

3. The tensioner according to claim 1, wherein the pressure adjusting mechanism includes a first restricting part that restricts movement of the piston unit toward the adjustment space.

4. The tensioner according to claim 1, wherein the pressure adjusting mechanism includes a second restricting part that restricts movement of the piston unit toward the oil pressure chamber.

5. The tensioner according to claim 4, wherein the piston spring as the piston biaser has a larger spring force than that of a main spring as the main biaser.

6. The tensioner according to claim 1, further comprising an oil supply passage that connects outside of the housing with the adjustment space, wherein the piston unit is configured as a check valve that allows oil to flow from the adjustment space to the oil pressure chamber and prevents oil from flowing from the oil pressure chamber to the adjustment space.

7. The tensioner according to claim 6, wherein the piston unit includes a check valve unit and an outer tube member disposed around an outer circumferential surface of the check valve unit, and the outer tube member includes a piston outer circumferential surface opposite the cylinder part.

\* \* \* \* \*